(12) United States Patent
Kuroda et al.

(10) Patent No.: US 7,809,256 B2
(45) Date of Patent: Oct. 5, 2010

(54) IMAGING LENS DEVICE AND IMAGING APPARATUS

(75) Inventors: Daisuke Kuroda, Kanagawa (JP); Yoshito Iwasawa, Tokyo (JP); Makoto Kanai, Tokyo (JP)

(73) Assignee: Sony Corporation, Tokyo (JP)

( * ) Notice: Subject to any disclaimer, the term of this patent is extended or adjusted under 35 U.S.C. 154(b) by 856 days.

(21) Appl. No.: 11/491,081

(22) Filed: Jul. 24, 2006

(65) Prior Publication Data

US 2007/0031134 A1 Feb. 8, 2007

(30) Foreign Application Priority Data

Jul. 27, 2005 (JP) ............... 2005-217288

(51) Int. Cl.
G03B 17/00 (2006.01)
H04N 5/228 (2006.01)
G02B 27/64 (2006.01)

(52) U.S. Cl. .............. 396/55; 396/52; 348/208.2; 348/208.11; 359/557

(58) Field of Classification Search ............. 396/52–55; 348/208.99, 208.1, 208.2, 208.3, 208.4, 208.5, 348/208.6, 208.8, 208.11, 208.12, 208.13, 348/208.14, 208.15, 208.16; 359/554–557
See application file for complete search history.

(56) References Cited

U.S. PATENT DOCUMENTS

| 5,825,546 A | 10/1998 | Matsui |
| 2005/0225646 A1* | 10/2005 | Shintani ................ 348/208.99 |

FOREIGN PATENT DOCUMENTS

| DE | 198 55 693 A1 | 6/1999 |
| DE | 101 33 671 A1 | 1/2002 |
| EP | 773460 | 5/1997 |
| JP | 2000-131610 A | 5/2000 |
| JP | 2002-049070 A | 2/2002 |
| JP | 2002-090650 A | 3/2002 |

(Continued)

OTHER PUBLICATIONS

Communication from European Patent Office dated Mar. 21, 2007 for application No. 06117977.6-2217.

(Continued)

*Primary Examiner*—Rochelle-Ann J Blackman
(74) *Attorney, Agent, or Firm*—Rader, Fishman & Grauer PLLC

(57) ABSTRACT

The invention aims to achieve slim design by employing a light path folding optical system, add a hand-shake correction capability, and lower power consumption. An imaging lens device includes a light path folding optical system having a reflector that folds the optical axis incident perpendicular to the gravitational direction toward the gravitational direction, and an imaging element that converts an image formed by the light path folding optical system into an electrical signal. The imaging lens device also includes drive means that moves some of lens groups or one lens (hereinafter referred to as "shake correction lens group") in the direction perpendicular to the optical axis folded toward the gravitational direction by the reflector (hereinafter referred to as "vertical optical axis"). The shake correction lens group is moved in the direction perpendicular to the vertical optical axis to move the image in the direction perpendicular to the vertical optical axis.

13 Claims, 9 Drawing Sheets

FOREIGN PATENT DOCUMENTS

| | | |
|---|---|---|
| JP | 3359131 B | 12/2002 |
| JP | 2004-170707 A | 6/2004 |
| JP | 2004-354869 A | 12/2004 |
| JP | 2005-077886 A | 3/2005 |
| JP | 2005-084283 A | 3/2005 |
| JP | 2005-091465 A | 4/2005 |
| JP | 2005-128065 A | 5/2005 |
| JP | 2006-195068 A | 7/2006 |
| WO | WO 2004/010199 A2 | 1/2004 |

OTHER PUBLICATIONS

European Search Report dated Jul. 4, 2007 issued in European Application No. 06117977.6-2217.

Japanese Office Action issued Oct. 8, 2009 for corresponding Japanese Application No. 2005-217288.

* cited by examiner

IMAGING LENS DEVICE AND IMAGING APPARATUS

CROSS REFERENCES TO RELATED APPLICATIONS

The present invention contains subject matter related to Japanese Patent Application JP 2005-217288 filed in the Japanese Patent Office on Jul. 27, 2005, the entire contents of which being incorporated herein by reference.

BACKGROUND OF THE INVENTION

1. Field of the Invention

The present invention relates to a novel imaging lens device and imaging apparatus. The invention particularly relates to an imaging lens device that is of compact design and has an anti-vibration capability of correcting image-shake due to unpredictable vibration with less power consumption so that it is suitable for an imaging lens device for digital input/output equipment, such as digital still cameras and digital video camcorders.

2. Description of the Related Art

In recent years, imaging apparatus using a solid-state imaging element, such as digital still cameras, have become commonplace. Among others, in the case of digital still cameras and the like, it is desired to develop an imaging lens having excellent imaging performance that matches with a megapixel solid-state imaging element. A strong need also exists for a compact, in particular, slim lens. Imaging lenses in which compact design of the lens is achieved by decreasing the distance between the pixels to reduce the size of the imaging element, and slim design of the lens is achieved by employing a light path folding optical system have become commonplace.

For example, the optical system described in JP-A-2000-131610 achieves slim design in the direction of the optical axis of incoming light by using a reflective member while maintaining high imaging performance. However, an imaging apparatus employing such a light path folding optical system is much more susceptible to hand-shake during image acquisition due to the resultant compact and slim design of the apparatus together with higher resolution and compact design of the imaging element. Accordingly, there exists an increased demand to add a hand-shake correction capability.

On the other hand, Japanese Patent No. 3359131 proposes an optical system having an anti-vibration capability in which a shake correction lens group is shifted in the direction perpendicular to the optical axis.

SUMMARY OF THE INVENTION

However, the optical system described in Japanese Patent No. 3359131 has a problem because it is configured such that the shake correction lens group is shifted in the direction perpendicular to the optical axis extending horizontally, the shake correction lens group needs to be held against the gravitational force and hence may require a full-time driving force, resulting in increased power consumption.

In view of the above problems, the invention aims to achieve slim design by employing a light path folding optical system, add a hand-shake correction capability, and lower power consumption.

According to an embodiment of the invention, there is provided an imaging lens device. The imaging lens device includes a light path folding optical system having a reflector that folds the optical axis incident perpendicular to the gravitational direction toward the gravitational direction and an imaging element that converts an image formed by the light path folding optical system into an electrical signal. The imaging lens device also includes drive means that moves some of lens groups or one lens (hereinafter referred to as "shake correction lens group") in the direction perpendicular to the optical axis folded toward the gravitational direction by the reflector (hereinafter referred to as "vertical optical axis"). The imaging lens device is configured such that the shake correction lens group is moved in the direction perpendicular to the vertical optical axis to move the image in the direction perpendicular to the vertical optical axis.

Therefore, in the imaging lens device according to an embodiment of the invention, the shake correction lens group is supported in the gravitational direction.

An imaging lens device according to another embodiment of the invention is configured such that the imaging element, instead of the shake correction lens group, is moved in the direction perpendicular to the vertical optical axis.

An imaging apparatus according to an embodiment or another embodiment of the invention includes the imaging lens device according to the embodiment or the other embodiment of the invention, and further includes hand-shake detection means that detects shake of the imaging lens device and hand-shake correction control means that corrects displacement of the imaging position of an object image based on the shake of the imaging lens device detected by the hand-shake detection means. The hand-shake correction control means instructs the drive means to move the shake correction lens group or the imaging element by an amount and in a direction based on the shake of the imaging lens device detected by the hand-shake detection means.

Therefore, the imaging apparatus according to the embodiment or the other embodiment of the invention can correct image-shake due to shake of the imaging lens device.

An imaging lens device according to an embodiment of the invention includes a light path folding optical system having a reflector that folds the optical axis incident perpendicular to the gravitational direction toward the gravitational direction and an imaging element that converts an image formed by the light path folding optical system into an electrical signal. The imaging lens device also includes drive means for moving some of lens groups or one lens (hereinafter referred to as "shake correction lens group") in the direction perpendicular to the optical axis folded toward the gravitational direction by the reflector (hereinafter referred to as "vertical optical axis"). The imaging lens device is configured such that the shake correction lens group is moved in the direction perpendicular to the vertical optical axis to move the image in the direction perpendicular to the vertical optical axis.

An imaging lens device according to another embodiment of the invention includes a light path folding optical system having a reflector that folds the optical axis incident perpendicular to the gravitational direction toward the gravitational direction and an imaging element that converts an image formed by the light path folding optical system into an electrical signal. The imaging lens device also includes drive means that moves the imaging element in the direction perpendicular to the optical axis folded toward the gravitational direction by the reflector (hereinafter referred to as "vertical optical axis").

Therefore, in the imaging lens device according to the embodiment or the other embodiment of the invention, the use of the light path folding optical system allows a slim imaging lens device in the incoming optical axis direction. Furthermore, the shorter side of the imaging element is oriented to the direction that determines the thickness or the size in the incoming optical axis direction of the imaging lens device, allowing a slimmer imaging lens device.

In addition to the above, by moving the shake correction lens group or the imaging element in the direction perpendicular to the vertical optical axis, image-shake due to hand-shake can be corrected. Furthermore, the shake correction lens group or the imaging element may be moved in the direction perpendicular to the vertical optical axis only when hand-shake is to be corrected, while the shake correction lens group or the imaging element can be held aligned with the vertical optical axis only by supporting it in the gravitational direction when hand-shake correction may not be required. Therefore, unlike the conventional imaging lens device in which the shake correction lens group or the like is moved in the direction perpendicular to the optical axis extending horizontally, that is, in the vertical direction, very little holding electrical power may be required for holding the shake correction lens group or the like aligned with the optical axis, allowing decreased power consumption. In particular, to drive the shake correction lens group or the imaging element, the gravitational effect is not needed to be taken into account either in the pitch direction (depth direction) or the yaw direction (width direction). Therefore, the drive means can employ the same mechanism independent of the driving direction, allowing the mechanism and circuitry to be easily designed.

In an imaging lens device according to an embodiment of the invention, as the drive means mechanically bears the weight of the shake correction lens group or the imaging element in the gravitational direction, very little electrical power may be required for holding the shake correction lens group or the imaging element aligned with the vertical optical axis.

In an imaging lens device according to another embodiment of the invention, as the shake correction lens group is fixed in the vertical optical axis direction, there is no need to provide another drive means in the proximity of the above-mentioned drive means, thereby preventing an increased diameter of the lens barrel.

In an imaging lens device according to another embodiment of the invention, as the shake correction lens group is all or part of the lens group located closest to the imaging element and satisfies the condition equation (1) $|(1-\beta a) \times \beta b| < 1.8$, where $\beta a$ is the magnification of the shake correction lens group and $\beta b$ is the magnification of the lens group located next to the shake correction lens group and closer to the image plane, it is possible to correct hand-shake by shifting the shake correction lens group by a small amount without having to achieve high precision in positioning in the vertical optical axis direction. Moreover, all or part of the lens group is assigned as the shake correction lens group such that the space between the lens group and the imaging element is relatively large, allowing the drive means to be easily placed and designed.

In an imaging lens device according to another embodiment of the invention, the light path folding optical system includes a plurality of lens groups and works as a zoom lens system in which its magnification changes when the respective distances between the lens groups change. As the reflector is placed in a stationary lens group during zooming, the shake correction lens group or the imaging element can be oriented perpendicular to the gravitational direction and a compact imaging lens device can be easily achieved because the lens group accommodating the reflector, which tends to be large, is stationary.

In an imaging lens device according to another embodiment of the invention, the light path folding optical system includes, in order of increasing distance from an object, a first lens group that has positive power and is stationary during zooming, a second lens group having negative power, a third lens group having positive power, a fourth lens group having positive power, and a fifth lens group having negative power. Zooming is performed by moving at least the second and fourth lens groups. The first lens group includes, in order of increasing distance from an object, a first single lens having negative power, a reflector that folds the optical axis incident perpendicular to the gravitational direction by 90 degrees toward the gravitational direction, and at least one second lens having positive power. Since the reflector is accommodated in the first lens group that is stationary during zooming, a compact imaging lens device can be easily achieved. As the shake correction lens group is stationary during zooming and situated in the fifth lens group that is closest to the imaging element and may have a space for placing the drive means for shake correction, the drive means will not interfere with other drive means and optical members, allowing the drive means to be easily placed and designed. Additionally, as a positive lens group in the fifth lens group having negative power is used as the shake correction lens group, performance of hand-shake correction can be substantially consistent.

In an imaging lens device according to another embodiment of the invention, the mechanism of the drive means may not require any holding electrical power for holding the shake correction lens group aligned with the vertical optical axis, allowing decreased power consumption.

An imaging apparatus according to an embodiment of the invention includes an imaging lens device having a light path folding optical system and an imaging element that converts an image formed by the light path folding optical system into an electrical signal, hand-shake detection means that detects shake of the imaging lens device, and hand-shake correction control means that corrects displacement of the imaging position of the object image based on the shake of the imaging lens device detected by the hand-shake detection means. The imaging lens device includes a reflector that folds the optical axis incident perpendicular to the gravitational direction toward the gravitational direction, and drive means that moves some of lens groups or one lens (hereinafter referred to as "shake correction lens group") in the direction perpendicular to the optical axis folded toward the gravitational direction by the reflector (hereinafter referred to as "vertical optical axis"). The imaging lens device is configured such that the shake correction lens group is moved in the direction perpendicular to the vertical optical axis to move the image in the direction perpendicular to the vertical optical axis. The hand-shake correction control means instructs the drive means to move the shake correction lens group by an amount and in a direction based on the shake of the imaging lens device detected by the hand-shake detection means.

An imaging apparatus according to another embodiment of the invention includes an imaging lens device having a light path folding optical system and an imaging element that converts an image formed by the light path folding optical system into an electrical signal, hand-shake detection means that detects shake of the imaging lens device, and hand-shake correction control means that corrects displacement of the imaging position of the object image based on the shake of the imaging lens device detected by the hand-shake detection means. The imaging lens device includes a reflector that folds the optical axis incident perpendicular to the gravitational direction toward the gravitational direction, and drive means for moving the imaging element in the direction perpendicular to the optical axis folded toward the gravitational direction by the reflector (hereinafter referred to as "vertical optical axis"). The hand-shake correction control means instructs the drive means to move the imaging element by an amount and in a direction based on the shake of the imaging lens device detected by the hand-shake detection means.

Therefore, in the imaging apparatus according to the embodiment and the other embodiment of the invention, the use of the light path folding optical system allows a compact imaging apparatus in the incoming optical axis direction or a slim imaging apparatus, and moving the shake correction lens group or the imaging element in the direction perpendicular to the vertical optical axis allows hand-shake correction. Furthermore, a holding force may not be specially required for supporting the shake correction lens group or the imaging element in the gravitational direction, allowing decreased power consumption.

DESCRIPTION OF THE PREFERRED EMBODIMENTS

Figure 1:
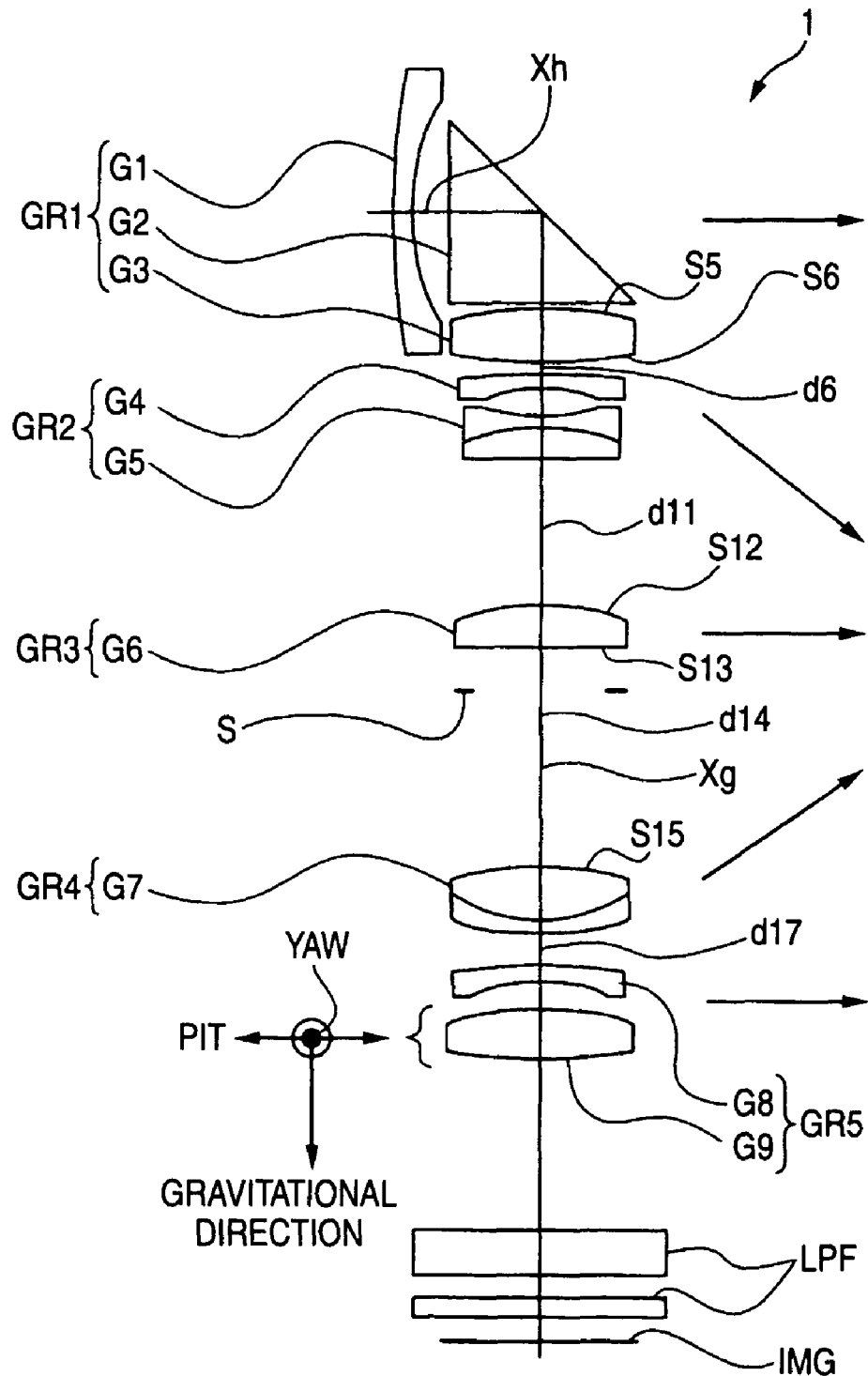
FIG. 1 is a lens block diagram showing a first embodiment of a light path folding optical system in an imaging lens device according to an embodiment of the invention.

Best modes for carrying out the imaging lens device and imaging apparatus according to an embodiment of the invention will be described below with reference to the accompanying drawings.

The imaging lens device according to an embodiment of the invention includes a light path folding optical system having a reflector that folds the optical axis incident perpendicular to the gravitational direction toward the gravitational direction, and an imaging element that converts an image formed by the light path folding optical system into an electrical signal.

The imaging lens device also includes drive means for moving some of lens groups or one lens (hereinafter referred to as "shake correction lens group"), or the imaging element in the direction perpendicular to the optical axis folded toward the gravitational direction by the reflector (hereinafter referred to as "vertical optical axis"). The imaging lens device is configured such that the shake correction lens group or the imaging element is moved in the direction perpendicular to the vertical optical axis to cancel image-shake that would be generated due to shake of the imaging lens device. For example, the imaging lens device is disposed in the imaging apparatus such that light flux enters the folding optical system from the direction perpendicular to the gravitational direction during normal use of the imaging apparatus.

Since the imaging lens device according to the embodiment of the invention has the reflector that folds the optical axis incident perpendicular to the gravitational direction toward the gravitational direction and the drive means that moves the shake correction lens group or imaging element in the direction perpendicular to the folded optical axis that is situated between the reflector and the imaging element (vertical optical axis), the size of the imaging lens device in the depth direction or the incoming optical axis direction can be reduced, resulting in a slim imaging lens device. For example, the imaging lens device is disposed in the imaging apparatus in such a manner that the optical axis of light flux entering the folding optical system from the direction perpendicular to the gravitational direction during normal use of the imaging apparatus is folded toward the gravitational direction and the shake correction lens group or the imaging element is moved in the direction perpendicular to the vertical optical axis to cancel image-shake that would be generated due to shake of the imaging lens device.

Furthermore, as the optical axis incident perpendicular to the gravitational direction is folded toward the gravitational direction and the imaging element is placed at a position along the folded optical axis, the shorter side of the imaging element is oriented to the direction that determines the thickness of the imaging lens device and hence the thickness of the imaging apparatus incorporating the imaging lens device, thereby providing a slimmer imaging apparatus.

Moreover, since the imaging lens device has the drive means that moves the shake correction lens group or the imaging element in the direction perpendicular to the folded optical axis that is situated between the reflector and the imaging element (vertical optical axis), and the shake correction lens group or the imaging element is oriented in the direction perpendicular to the gravitational direction in an ordinary imaging situation in which the incoming optical axis is oriented approximately in the horizontal direction, the driving force for holding the shake correction lens group or the imaging element against the gravitational force may not be always required, allowing substantially decreased power consumption. To drive the shake correction lens group or the imaging element, the gravitational effect may not be required to be taken into account either in the pitch direction (longitudinal direction of the screen) or the yaw direction (lateral direction of the screen). Therefore, the drive means can be the same configuration independent of the driving direction, as is the drive control. Even in an imaging situation in which the incoming optical axis is inclined somewhat upward or downward from the optical axis in the ordinary imaging situation, as the gravitational effect on the shake correction lens group is small, a small driving force will be enough to hold the shake correction lens group.

In an imaging lens device according to an embodiment of the invention, it is advantageous that the drive means mechanically bears the weight of the shake correction lens group in the gravitational direction. In this way, the driving force for holding the shake correction lens group or the imaging element against the gravitational force may not be always required, allowing substantially decreased power consumption. The gravitational effect may not be required to be taken into account in either the pitch or yaw direction, allowing the drive means to be the same configuration independent of the driving direction as well as the drive control to be performed in the same way.

In an imaging lens device according to an embodiment of the invention, the light path folding optical system includes a plurality of lens groups and works as a zoom lens system in which its magnification changes when the respective distances between the lens groups change. The reflector is advantageously placed in a stationary lens group during zooming. This arrangement allows the shake correction lens group or the imaging element to be oriented perpendicular to the gravitational direction as well as a slim imaging lens device in the incoming optical axis direction. This arrangement also allows a compact imaging lens device because the lens group accommodating the reflector, which tends to be large, is stationary.

In an imaging lens device according to an embodiment of the invention, it is advantageous to configure the drive means such that no holding electrical power may be required to hold the shake correction lens group aligned with the vertical optical axis. In this way, even when the imaging apparatus is set such that the hand-shake correction function is turned off, or when the imaging apparatus is rotated and held vertically, or when the imaging lens device is pointed in the gravitational or anti-gravitational direction, the driving force for holding the shake correction lens group or the imaging element may not be always required, allowing substantially decreased power consumption. Examples of the mechanism that may not require holding electrical power include those using, for example, a stepper motor, DC motor, or piezoelectric element.

When the shake correction lens group is used as means for correcting hand-shake, the shake correction lens group is desirably fixed in the vertical optical axis direction. Even when the light path folding optical system is a variable power optical system, the shake correction lens group fixed in the axial direction allows slim drive means. In particular, if not only drive means for moving the shake correction lens group in the direction perpendicular to the optical axis but also a mechanism for moving the same in the optical axis direction are together incorporated, the size of the driving mechanism for the shake correction lens group increases in the depth direction or the radial direction and a slim imaging lens device cannot be achieved.

When the shake correction lens group is used as means for correcting hand-shake, the shake correction lens group is desirably fixed in the vertical optical axis direction. In this way, there may be no need to provide another drive means, that is, means for moving the shake correction lens group in the optical axis direction, in the proximity of the above-mentioned drive means, thereby preventing an increased diameter of the lens barrel.

When the shake correction lens group is used as means for correcting hand-shake, the shake correction lens group is desirably all or part of a lens group located closest to the imaging element and satisfies the following condition equation (1):

$$|(1-\beta a) \times \beta b| < 1.8 \quad (1)$$

where $\beta a$ is the magnification of the shake correction lens group, and $\beta b$ is the magnification of the lens group located next to the shake correction lens group and closer to the image plane.

When the condition (1) is satisfied, it is possible to correct hand-shake by shifting the shake correction lens group by a small amount without having to achieve high precision in positioning in the vertical optical axis direction. In particular, for digital still cameras and the like in which the distance between pixels of the imaging element is very small and high precision positioning is desired, it is more preferable to satisfy $0.4 < |(1-\beta a) \times \beta b| < 1.2$.

When the shake correction lens group is used as means for correcting hand-shake, a desirable configuration is the following: the light path folding optical system includes, in order of increasing distance from an object, a first lens group that has positive power and is stationary during zooming, a second lens group having negative power, a third lens group having positive power, a fourth lens group having positive power, and a fifth lens group having negative power. Zooming is performed by moving at least the second and fourth lens groups. The first lens group includes, in order of increasing distance from an object, a first single lens having negative power, a reflector that folds the optical axis incident perpendicular to the gravitational direction by 90 degrees toward the gravitational direction, and at least one second lens having positive power. The fifth lens group includes a positive lens group as the shake correction lens group. By configuring as above, compact design and high performance can be achieved. As the second and fourth lens groups are movable and the third lens group is sensitive to eccentricity due to manufacturing error, they are not suitable for the shake correction lens group. Accordingly, the positive lens group in the fifth lens group having negative power is used as the shake correction lens group to achieve a light path folding optical system in which performance of hand-shake correction can be substantially consistent.

Examples of the reflector that changes by reflection the direction of the optical axis from the horizontal direction to the gravitational direction include a prism, mirror or free curved surface lens. To achieve compact design, a prism is preferably used. By shaping a prism to have a free curved surface, more compact design and higher performance can be achieved.

In the imaging lens device according to an embodiment of the invention, to achieve a slimmer size thereof, the shake correction lens group or the imaging element is preferably configured such that its movable ranges in the pitch and yaw directions are different. In particular, by setting the ratio of the travel in the pitch direction to that in the yaw direction within 0.5 to 1.0, the hand-shake correction mechanism containing drive means for the pitch direction (the longitudinal direction of the screen or the direction involved in thickness reduction) may be more compact.

Embodiments of a light path folding optical system of an imaging lens device according to an embodiment of the invention and numerical examples derived by applying specific numbers to the embodiments will be described.

FIG. 1 is a lens block diagram showing a first embodiment 1 of the light path folding optical system. The light path folding optical system 1 includes, in order of increasing distance from an object, a first lens group having positive power GR1, a second lens group having negative power GR2, a third lens group having positive power GR3, a fourth lens group having positive power GR4, and a fifth lens group having negative power GR5. The light path folding optical system 1 is a zoom lens in which the first lens group GR1, the third lens group GR3, and the fifth lens group GR5 are stationary in the optical axis direction and zooming is performed by moving the second and fourth lens groups GR2 and GR4 in the optical axis direction.

The first lens group GR1 includes a negative lens G1, a rectangular prism G2 that folds the optical axis Xh incident perpendicular to the gravitational direction by 90 degrees toward the gravitational direction, and a positive lens G3 having an aspheric surface on both sides. The second lens group GR2 includes a negative lens G4 and a doublet lens G5 formed of positive and negative lenses. The third lens group GR3 includes a positive lens G6 with an aspheric surface on both sides. The fourth lens group GR4 includes a doublet lens G7 formed of a positive lens with an aspheric surface on the object side and a negative lens. The fifth lens group GR5 includes a negative lens G8 and a positive lens G9. The positive lens G9 in the fifth lens group GR5 is shifted in the direction perpendicular to the folded optical axis (vertical optical axis) Xg to shift the image in the direction perpendicular to the vertical optical axis Xg. An aperture stop S is located close to the image-side surface of the third lens group GR3 and stationary during zooming. A lowpass filter LPF is inserted between the fifth lens group GR5 and the image plane IMG. In FIG. 1, the arrow in the width direction of the page represents the pitch (Pit) direction, and the arrow in the direction perpendicular to the page represents the yaw (Yaw) direction, and the downward arrow on the page represents the gravitational direction.

The table 1 below shows specification values of a numerical example 1 derived by applying specific values to the light path folding optical system 1 according to the first embodiment. In the specification value tables of the numerical example 1 and the following numerical examples described later, the "surface number" denotes the i-th surface from the object. Symbol R denotes the radius of curvature of the i-th optical surface. Symbol d denotes the axial distance between the i-th optical surface and (i+1)-th optical surface from the object. Symbol nd denotes the refractive index at the d-line ($\lambda$=587.6 nm) of the glass material having the i-th optical surface on the object side. Symbol vd denotes the Abbe number at d-line of the glass material having the i-th optical surface on the object side. Symbols INFINITY, REF and ASP denote that the surface in question is a planar surface, reflective surface and aspheric surface, respectively. The shape of an aspheric surface is expressed by the following equation 1, where x is the axial distance from the lens apex, y is the height in the direction perpendicular to the optical axis, c is the paraxial curvature at the lens apex, K is the Conic constant, and $A^i$ is the i-th order aspheric surface coefficient.

[Equation 1]

TABLE 1

| surface number | R | d | nd | vd |
|---|---|---|---|---|
| 1: | 37.313 | 0.650 | 1.92286 | 20.884 |
| 2: | 8.648 | 1.380 | | |
| 3: | INFINITY | 6.900 | 1.83500 | 42.984 |
| 4: | INFINITY | 0.200 | | |
| 5: | 11.744 (ASP) | 1.988 | 1.76802 | 49.300 |
| 6: | −18.325 (ASP) | d6 | | |
| 7: | 24.918 | 0.500 | 1.88300 | 40.805 |
| 8: | 6.216 | 1.048 | | |
| 9: | −7.984 | 0.500 | 1.80420 | 46.503 |
| 10: | 8.715 | 1.049 | 1.92286 | 20.884 |

TABLE 1-continued

| surface number | R | d | nd | vd |
|---|---|---|---|---|
| 11: | 60.123 | d11 | | |
| 12: | 10.486 (ASP) | 1.488 | 1.77377 | 47.200 |
| 13: | −37.305 (ASP) | 0.960 | | |
| 14: | stop | d14 | | |
| 15: | 13.0477 (ASP) | 2.086 | 1.66672 | 48.297 |
| 16: | −5.584 | 0.500 | 1.90366 | 31.310 |
| 17: | −12.676 | d17 | | |
| 18: | 34.016 | 0.500 | 1.84666 | 23.785 |
| 19: | 6.234 | 1.187 | | |
| 20: | 10.281 | 1.785 | 1.48749 | 70.441 |
| 21: | −37.764 | 6.641 | | |
| 22: | INFINITY | 1.600 | 1.51680 | 64.198 |
| 23: | INFINITY | 1.065 | | |
| 24: | INFINITY | 0.500 | 1.51680 | 64.198 |
| 25: | INFINITY | | | |

In the light path folding optical system 1, when the positional layout of the lenses changes from the wide-angle side to the telescopic side, the distance d6 between the first lens group GR1 and second lens group GR2, the distance d11 between the second lens group GR2 and third lens group GR3, the distance d14 between the aperture stop S and fourth lens group GR4, and the distance d17 between the fourth lens group GR4 and fifth lens group GR5 change. Table 2 shows the above distances at the wide-angle side, at an intermediate focal length position between the wide-angle side and the telescopic side, and at the telescopic side for the numerical example 1, together with the focal lengths f, F numbers FNo. and half angles of view $\omega$.

TABLE 2

| FNo. = | 3.60–3.88–4.63 |
|---|---|
| f = | 6.52–10.95–18.54 |
| $\omega$ = | 30.54–18.29–10.86 |
| d6 = | 0.500–3.544–5.564 |
| d11 = | 5.564–2.520–0.500 |
| d14 = | 7.525–4.851–1.882 |
| d17 = | 1.300–3.974–6.943 |

In the light path folding optical system 1, the both surfaces S5 and S6 of the positive lens G3 in the first lens group GR1, the both surfaces S12 and S13 of the positive lens G6 that forms the third lens group GR3, and the object side surface S15 of the fourth lens group GR4 are aspheric surfaces. Table 3 shows the fourth, sixth, eighth and tenth order aspheric surface coefficients of the above aspheric surfaces for the numerical example 1, together with the Conic constants K. In Table 3 and the table below showing aspheric surface coefficients, "E−i" denotes the base 10 exponential notation and thus represents "$10^{-i}$". For example, "0.12345E−05" represents "$0.12345 \times 10^{-5}$."

TABLE 3

| surface number | K | $A^4$ | $A^6$ | $A^8$ | $A^{10}$ |
|---|---|---|---|---|---|
| 5 | 1 | −0.128629E−03 | −0.682694E−05 | 0.467326E−06 | −0.321073E−07 |
| 6 | 1 | −0.262565E−04 | −0.376614E−05 | 0.217917E−06 | −0.236060E−07 |
| 12 | 1 | 0.628194E−03 | 0.297806E−04 | 0.294596E−05 | 0.847943E−07 |
| 13 | 1 | 0.944369E−03 | 0.454797E−04 | 0.140106E−05 | 0.321119E−06 |
| 15 | 1 | −0.603083E−04 | 0.427956E−05 | −0.117877E−06 | 0.644946E−08 |

Figure 2:
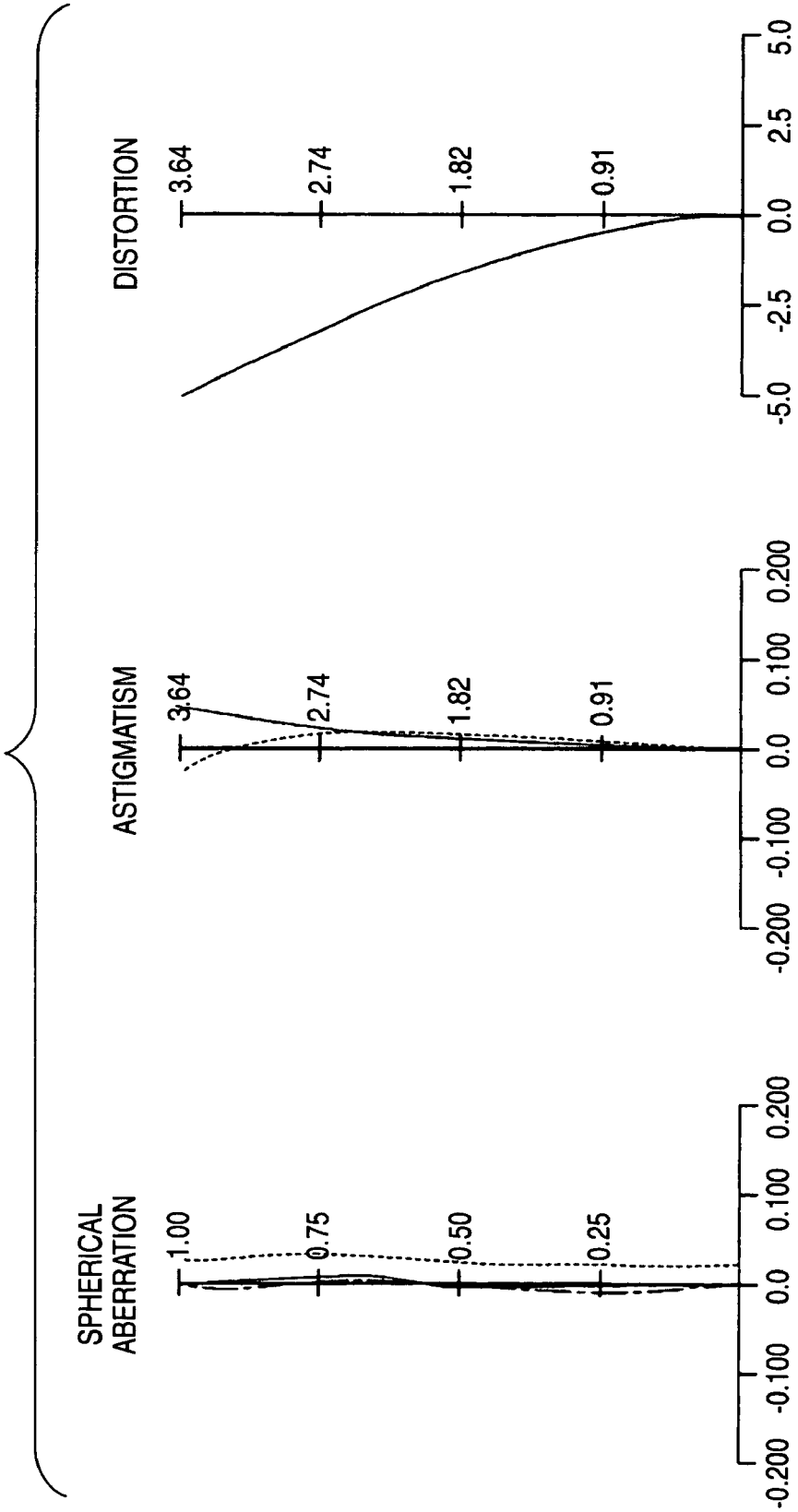
FIG. 2 shows aberration diagrams for a numerical example 1 derived by applying specific values to the first embodiment of the light path folding optical system together with FIGS. 3 and 4, showing spherical aberration, astigmatism and distortion at the wide-angle side.
Figure 3:
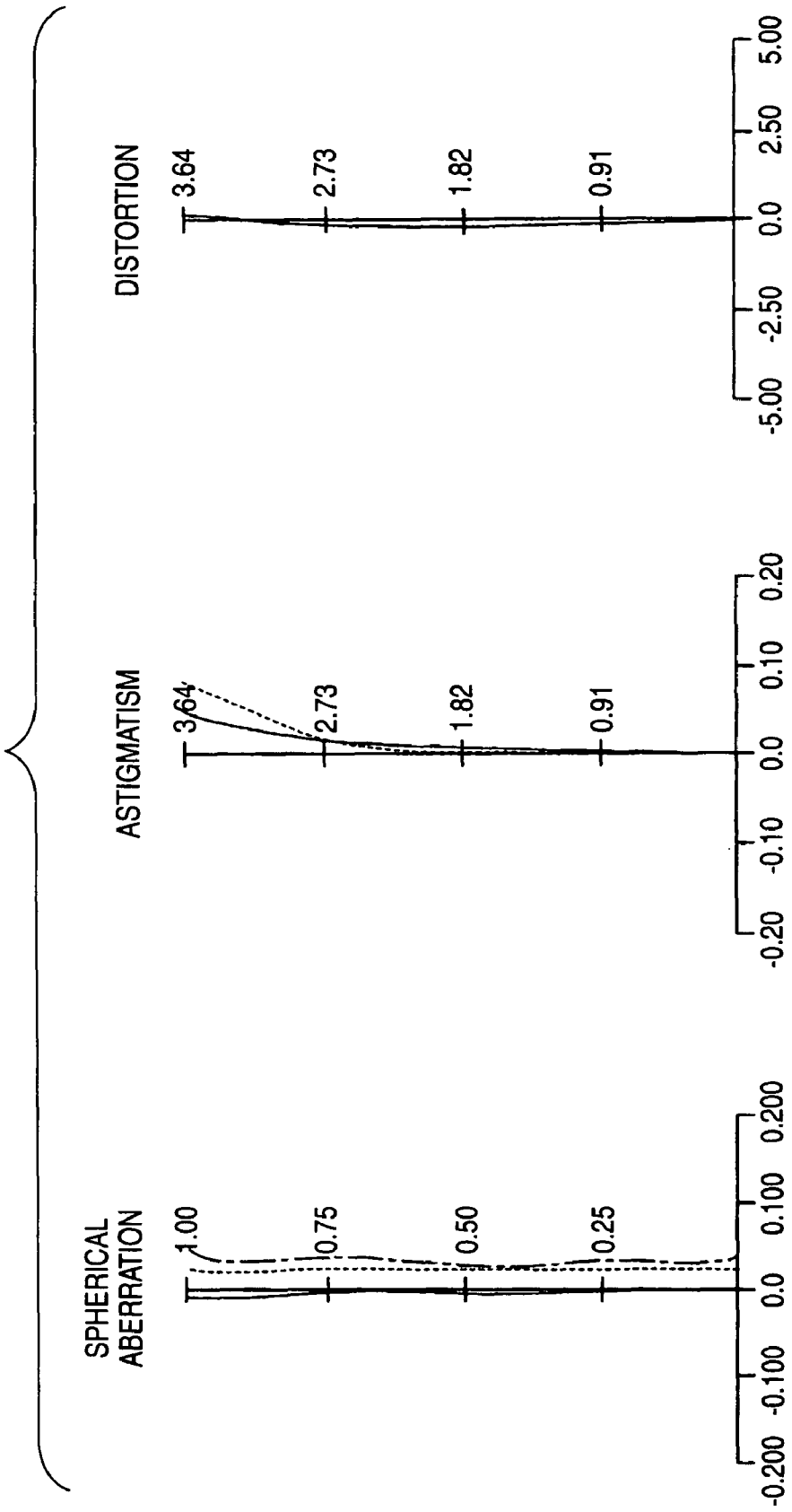
FIG. 3 shows spherical aberration, astigmatism and distortion at an intermediate focal length position.
Figure 4:
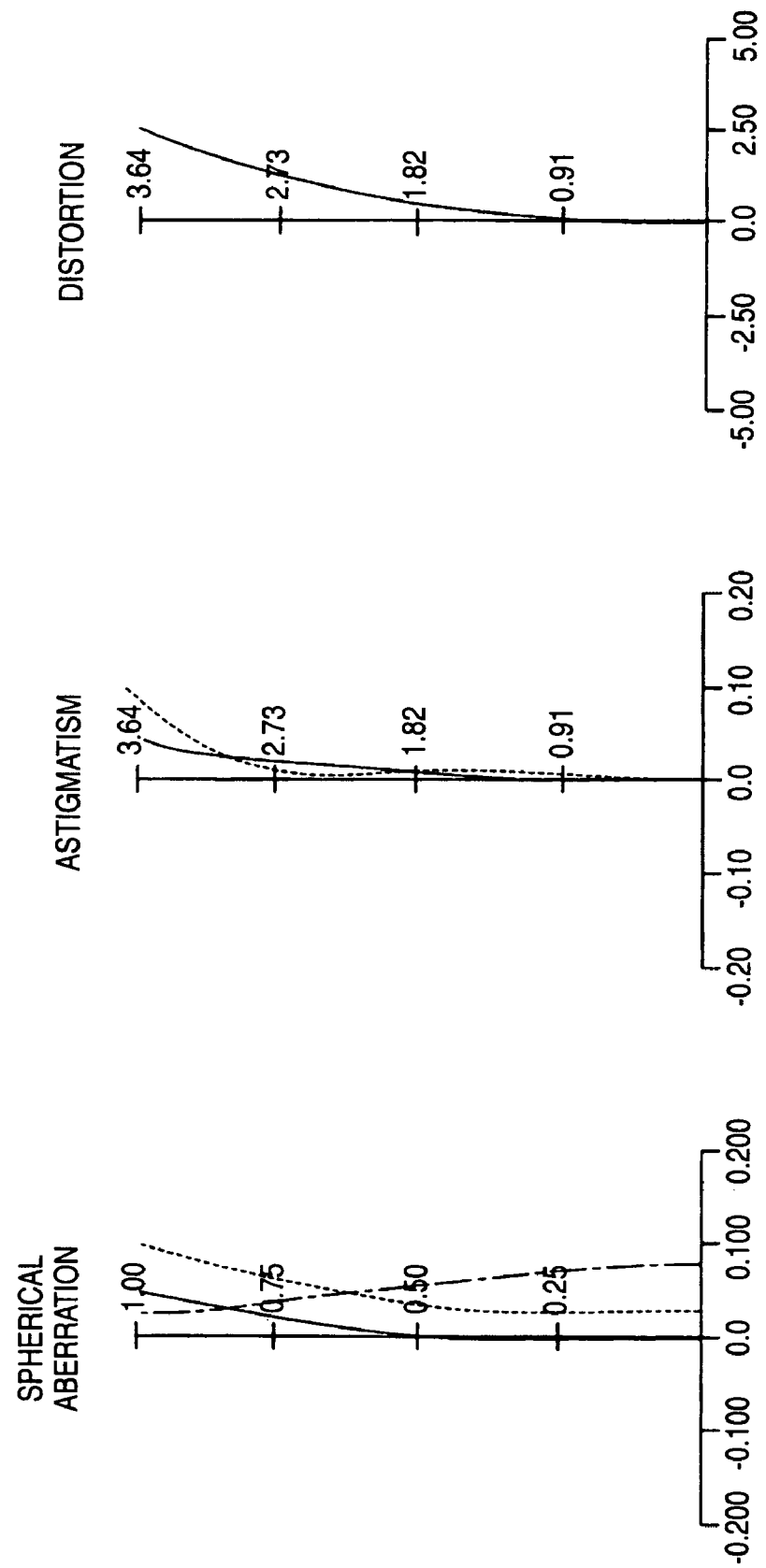
FIG. 4 shows spherical aberration, astigmatism and distortion at the telescopic side.

FIGS. 2 to 4 are aberration diagrams for the numerical example 1 when the light path folding optical system is focused at infinity, and set at the wide-angle position (f=6.52), at an intermediate focal length position (f=3.88), and at the telescopic position (f=18.54), respectively.

In the aberration diagrams of FIGS. 2 to 4, for spherical aberration, the ordinate represents the ratio of the spherical aberration to the full-aperture F number and the abscissa represents defocus, where the solid line represents spherical aberration for d-line, the alternate long and short dashed line for C-line, and the dotted line for g-line. For astigmatism, the ordinate represents image height and the abscissa represents focus, where the solid line represents astigmatism for the sagittal image plane and the dashed line for the meridional image plane. For distortion, the ordinate represents image height and the abscissa represents percentage.

Figure 5:
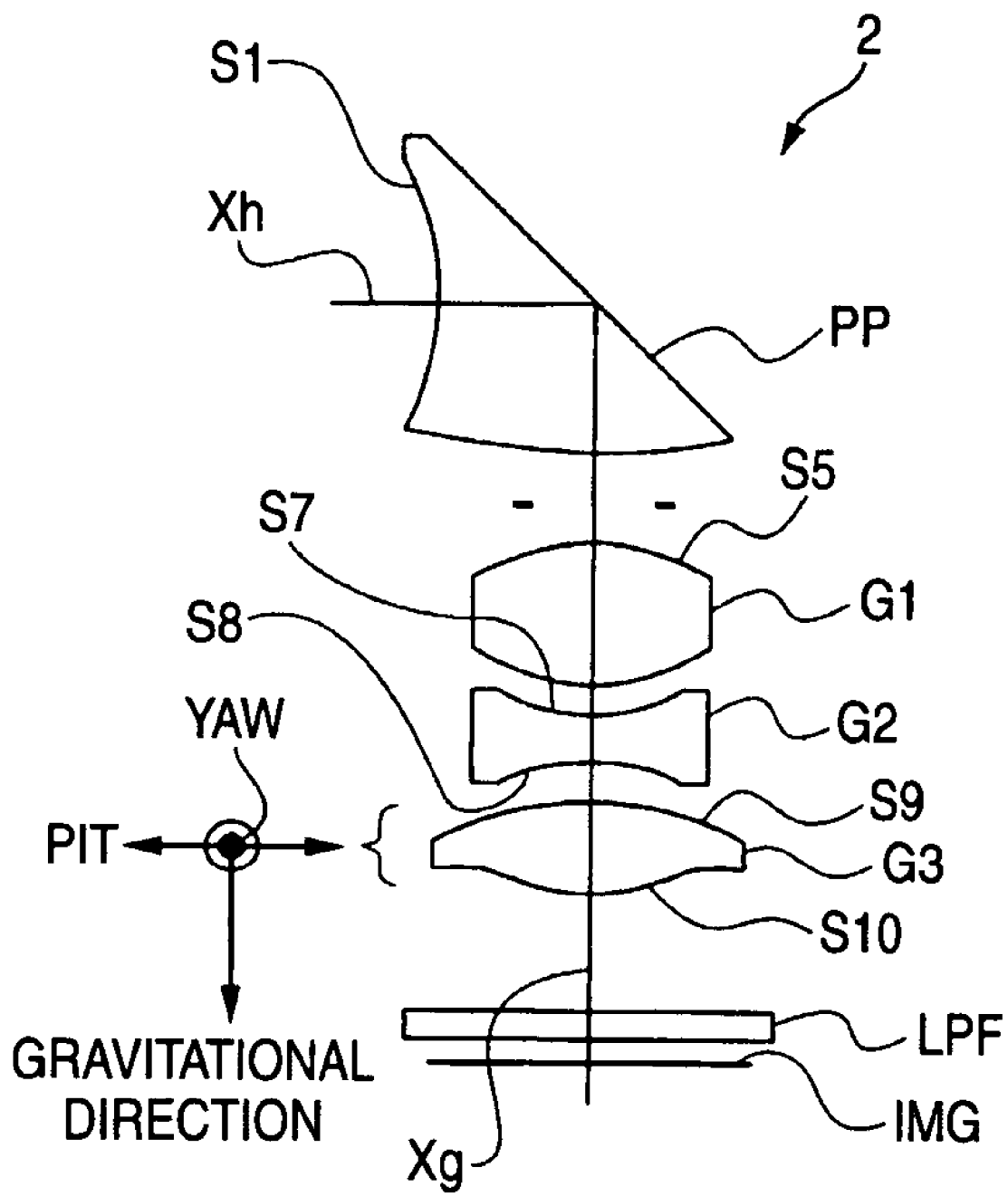
FIG. 5 is a lens block diagram showing a second embodiment of a light path folding optical system in an imaging lens device according to an embodiment of the invention.

FIG. 5 is a lens block diagram showing a second embodiment 2 of a light path folding optical system in an imaging lens device according to an embodiment of the invention. The light path folding optical system 2 includes, in order of increasing distance from an object, a plastic prism PP that has an aspheric surface on the object side having negative power and folds the optical axis Xh incident perpendicular to the gravitational direction by 90 degrees toward the gravitational direction, a positive plastic lens G1 having an aspheric surface on the object side, a negative plastic lens G2 having an aspheric surface on both sides, and a positive plastic lens G3 having an aspheric surface on both sides. The positive plastic lens G3 that is situated closest to the image plane and has an aspheric surface on both sides is shifted in the direction perpendicular to the folded optical axis (vertical optical axis) Xg to shift the image in the direction perpendicular to the vertical optical axis Xg. An aperture stop S is located between the plastic prism PP and the positive plastic lens G1. A lowpass filter LPF is inserted between the final lens G3 and the image plane IMG. In FIG. 5, the arrow in the width direction of the page represents the pitch (Pit) direction, and the arrow in the direction perpendicular to the page represents the yaw (Yaw) direction, and the downward arrow on the page represents the gravitational direction.

The table 4 shows specification values of a numerical example 2 derived by applying specific values to the second embodiment 2.

TABLE 4

| surface number | R | | D | Nd | Vd |
| --- | --- | --- | --- | --- | --- |
| 1 | −4.754 | ASP | 2.900 | 1.5300 | 55.844 |
| 2 | INFINITY | REF | 2.900 | | |
| 3 | −11.245 | | 1.000 | | |
| stop | INFINITY | | 0.700 | | |
| 5 | 3.561 | ASP | 2.634 | 1.5830 | 59.500 |
| 6 | −3.834 | | 0.650 | | |
| 7 | −2.404 | ASP | 0.850 | 1.5830 | 30.000 |
| 8 | 5.524 | ASP | 1.031 | | |
| 9 | 7.150 | ASP | 1.733 | 1.5300 | 55.844 |
| 10 | −3.698 | ASP | 2.103 | | |
| 11 | INFINITY | | 0.500 | 1.5168 | 64.200 |
| 12 | INFINITY | | 0.500 | | |
| i | INFINITY | | 0.000 | | |

Table 5 shows the focal length f, F number Fno. and half angle of view ω for the numerical example 2.

TABLE 5

| f | 4.68 |
| --- | --- |
| Fno. | 2.82 |
| ω | 32.25 |

In the light path folding optical system 2, the object side surface S1 of the plastic prism PP, the object side surface S5 of the positive plastic lens G1, the both sides S7 and S8 of the negative plastic lens G2, and the both sides S9 and S10 of the positive plastic lens G3 are aspheric surfaces. Table 6 shows the fourth, sixth, eighth and tenth order aspheric surface coefficients of the above aspheric surfaces for the numerical example 2, together with the Conic constants K.

TABLE 6

| surface number | K | $A^4$ | $A^6$ | $A^8$ | $A^{10}$ |
| --- | --- | --- | --- | --- | --- |
| 1 | 0.000E+00 | 3.165E−03 | −4.400E−05 | 6.727E−07 | 7.529E−08 |
| 5 | 0.000E+00 | −4.635E−03 | −5.385E−05 | −2.888E−04 | 4.322E−05 |
| 7 | 0.000E+00 | 1.720E−02 | 2.153E−03 | 0.000E+00 | 0.000E+00 |
| 8 | 0.000E+00 | 3.278E−03 | 2.266E−03 | −5.217E−04 | 6.296E−05 |
| 9 | 0.000E+00 | −2.953E−03 | 1.835E−03 | −2.051E−04 | 6.621E−06 |
| 10 | 0.000E+00 | 9.940E−03 | 2.285E−04 | 2.208E−04 | −2.395E−05 |

Figure 6:
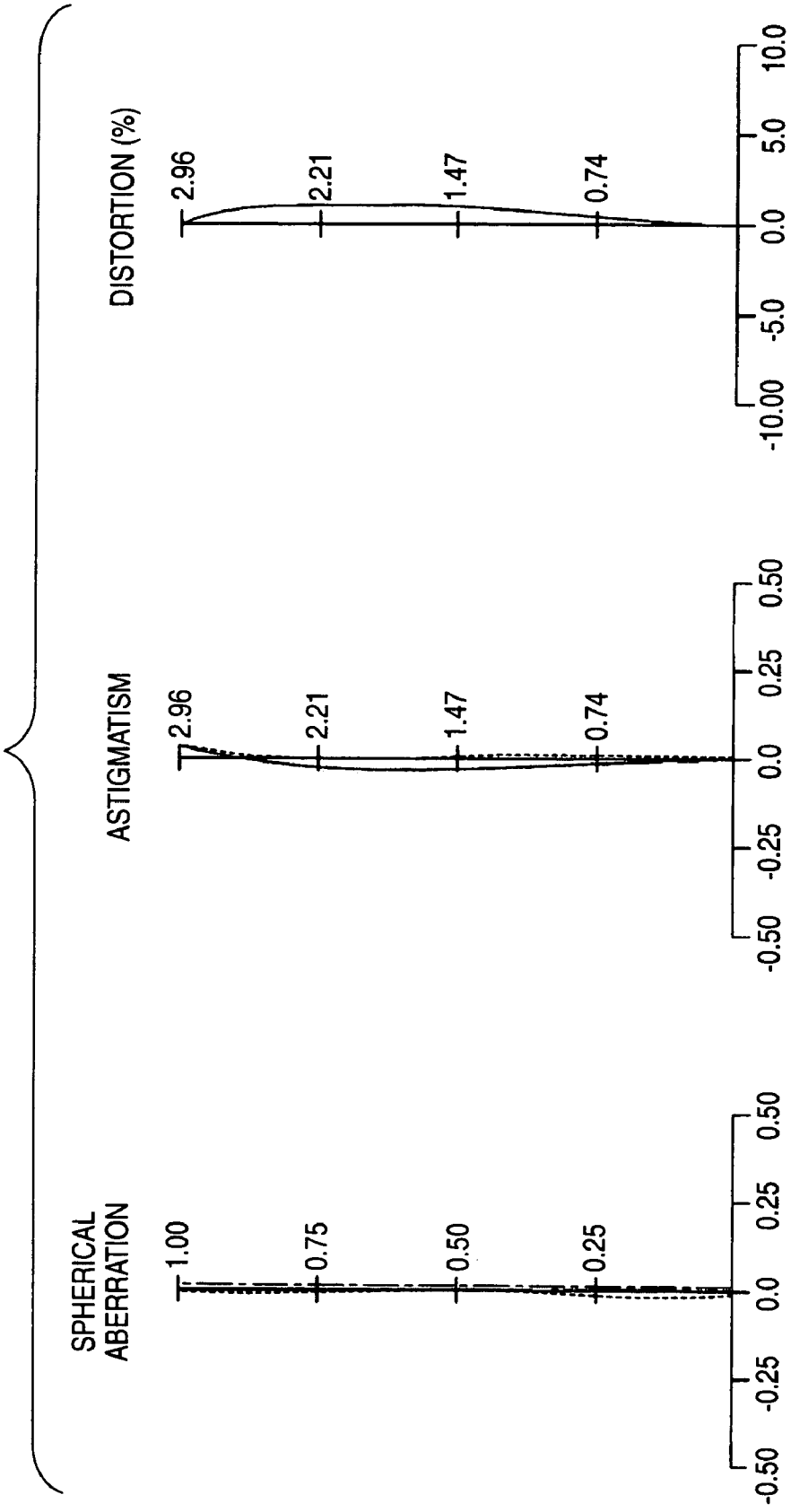
FIG. 6 shows spherical aberration, astigmatism and distortion for a numerical example 2 derived by applying specific values to the second embodiment of the light path folding optical system.

FIG. 6 shows aberration diagrams for the numerical example 2 when the light path folding optical system is focused at infinity. For spherical aberration, the ordinate represents the ratio of the spherical aberration to the full-aperture F number and the abscissa represents defocus, where the solid line represents spherical aberration ford-line, the alternate long and short dashed line for C-line, and the dotted line for g-line. For astigmatism, the ordinate represents image height and the abscissa represents focus, where the solid line represents astigmatism for the sagittal image lane and the dashed line for the meridional image plane. For distortion, the ordinate represents image height and the abscissa represents percentage.

Table 7 shows values for evaluating the lens condition on (1) shown in each of the numerical examples 1 and 2.

TABLE 7

| | numerical example 1 | | | numerical example 2 |
|---|---|---|---|---|
| f | 6.52 | 10.95 | 18.54 | 4.68 |
| $|(1 - \beta a) \times \beta b|$ | 0.69 | 0.69 | 0.69 | 0.69 |

As clearly indicated in the tables (Tables 1 to 7), the lenses shown in the numerical examples 1 and 2 satisfy the condition equation (1). Also, as shown in the aberration diagrams, each aberration is well corrected at the wide-angle side, intermediate focal length position between the wide-angle and telescopic sides, and at the telescopic side.

Figure 7:
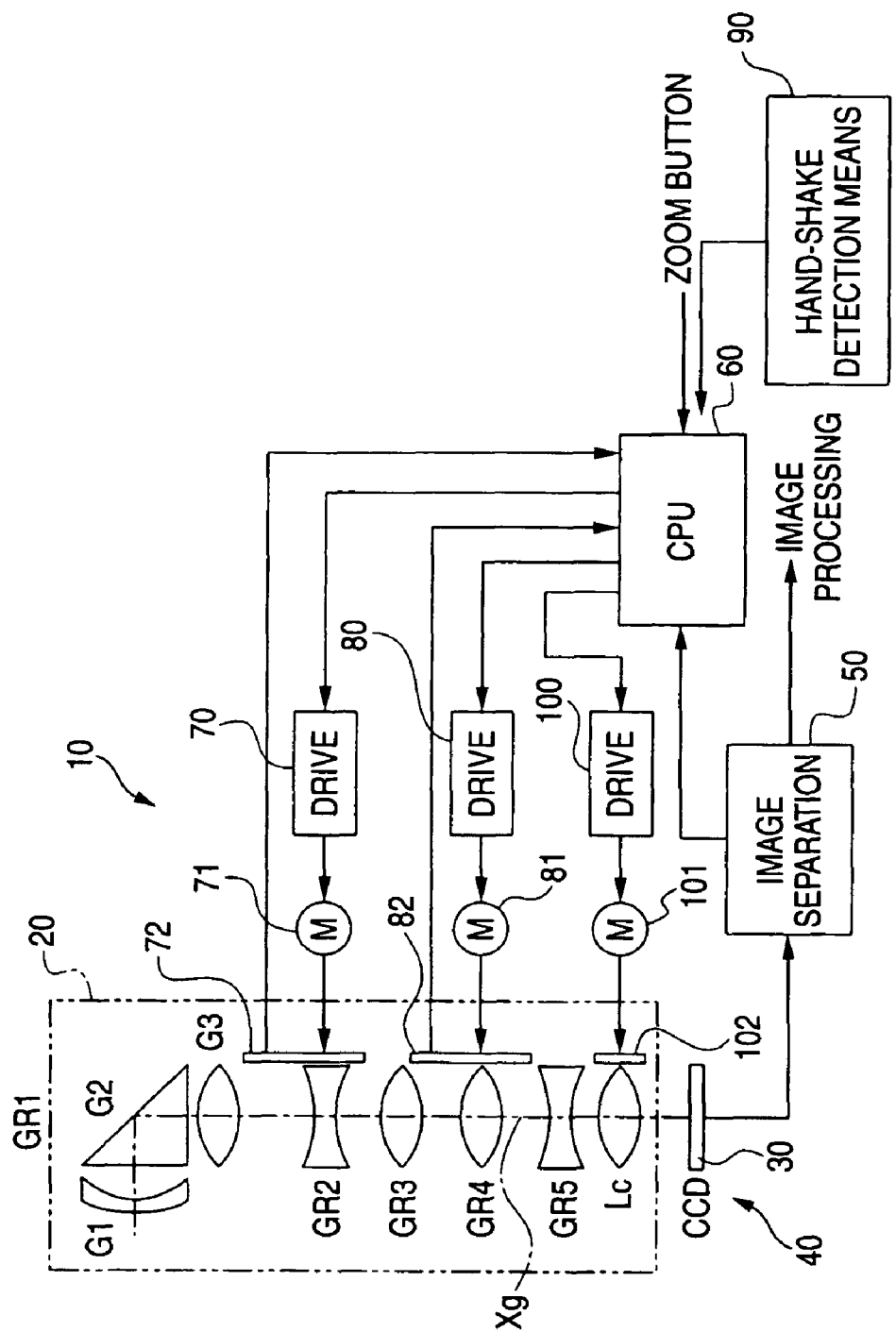
FIG. 7 is a block diagram showing an imaging apparatus according to an embodiment of the invention.

FIG. 7 shows an embodiment of the imaging apparatus according to an embodiment of the invention. The imaging apparatus 10 includes a light path folding optical system 20, an imaging element 30 for converting an optical image formed by the light path folding optical system 20 into an electrical signal, an imaging lens device 40 having drive means for moving a shake correction lens group Lc in the direction perpendicular to the vertical optical axis Xg. The imaging element may be an CCD (Charge Coupled Device) or CMOS (Complementary Metal-Oxide Semiconductor) type optoelectronic conversion element. The light path folding optical system 20 may be a folding optical system according to an embodiment of the invention. FIG. 7 shows the light path folding optical system 1 according to the first embodiment shown in FIG. 1, but each lens group is represented by a single lens in a simplified manner. Of course, besides the light path folding optical system 1 according to the first embodiment, the light path folding optical system 2 according to the second embodiment or light path folding optical systems according to other embodiments of the invention other than those shown herein may be used.

An image separation circuit 50 divides the electrical signal formed by the imaging element 30 into a focus control signal and an image signal, and sends them to a control circuit 60 and an image processing circuit, respectively. The signal sent to the image processing circuit is processed into a form suitable for subsequent processing and undergoes various processing, for example, displaying on a display device, recording on a recording medium, and forwarding over communication means.

The control circuit 60 receives external operation signals, such as a zoom button operation, and performs various processing in response to the operation signals. For example, when a zooming instruction is inputted from the zoom button, the control circuit 60 actuates drive units 71 and 81 via driver circuits 70 and 80 to move the second and fourth lens groups GR2 and GR4 to predetermined positions. Positional information on the second and fourth lens groups GR2 and GR4 detected by sensors 72 and 82 is inputted to the control circuit 60 and referred when the control circuit 60 outputs instruction signals to the driver circuits 70 and 80. The control circuit 60 also checks the focus status based on the signal sent from the image separation circuit 50 and controls, for example, the fourth lens group GR4 via the driver circuit 80 such that the best focus status is achieved.

The control circuit 60 also receives a signal from hand-shake detection means 90, such as a gyroscopic sensor, for detecting shake of the body of the imaging element 30 and calculates a shake angle for compensating for the hand-shake. To move the shake correction lens group Lc to a position corresponding to the calculated shake angle, the control circuit 60 actuates a drive unit 101 via a driver circuit 100 (the driver circuit 100 and the control circuit 60 form hand-shake correction control means). Consequently, the shake correction lens group Lc is moved to a predetermined position to prevent the imaging position of the object image formed by the light path folding optical system 20 from deviating. Positional information on the shake correction lens group Lc obtained from a sensor 102 is inputted to the control circuit 60 and referred when the control circuit 60 outputs an instruction signal to the driver circuit 100.

Figure 8:
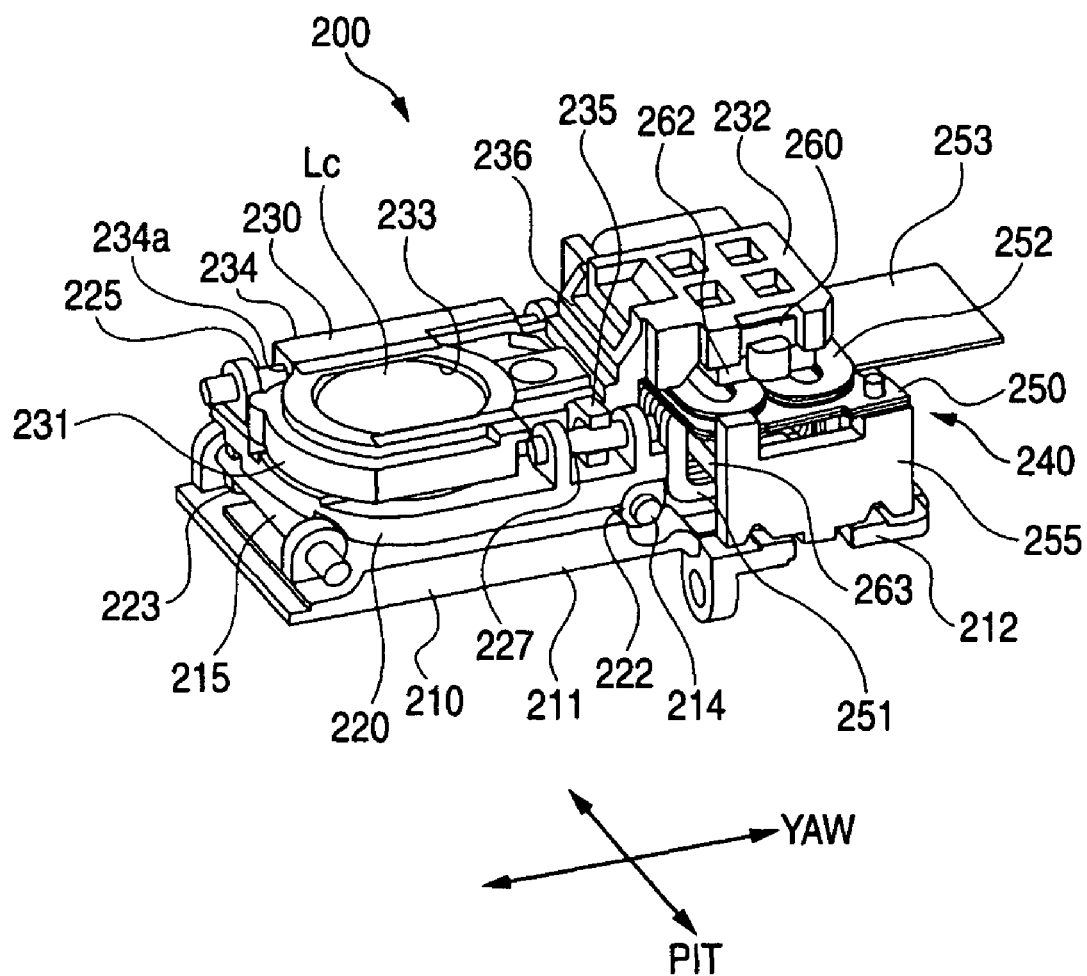
FIG. 8 shows one example of drive means for moving the shake correction lens (group) together with FIG. 9.
Figure 9:
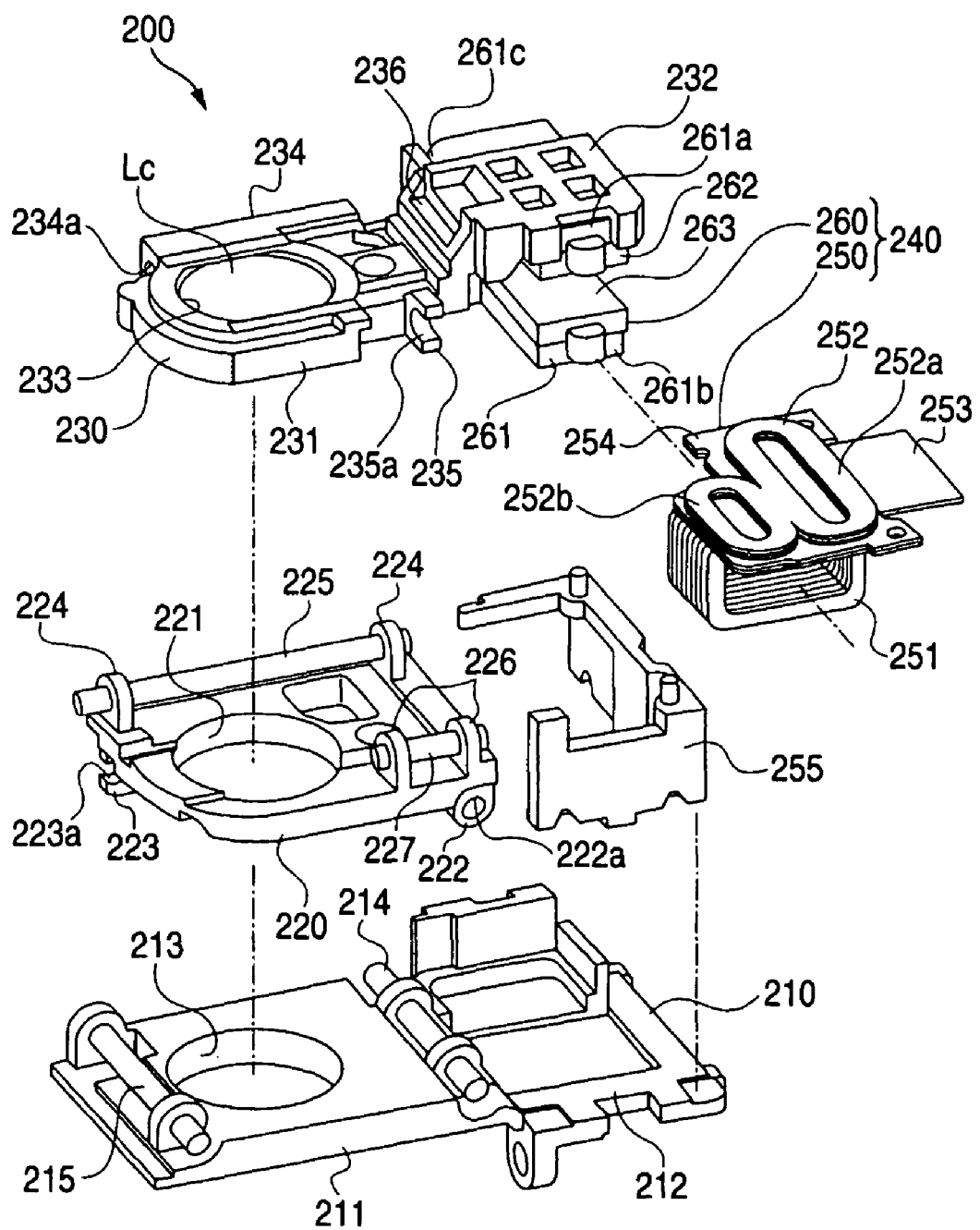
FIG. 9 is a perspective exploded view.

The above imaging apparatus 10 may take various forms when it is applied to a specific product. For example, the imaging apparatus 10 has a wide range of applications as a camera unit for digital input/output equipment, such as digital still cameras, digital video camcorders, mobile phones with a built-in camera, PDAs (Personal Digital Assistants) with a built-in camera. FIGS. 8 and 9 show one example of drive means for moving the shake correction lens group Lc in the direction perpendicular to the vertical optical axis direction.

The shake correction lens group Lc is moved by a double-axis actuator 200 with a built-in linear motor as drive means in two axial directions, that is, the pitch direction (the direction indicated by the arrow Pit in FIG. 8) and the yaw direction (the direction indicated by the arrow Yaw in FIG. 8).

The double-axis actuator 200 includes a first movable frame 220 that is movably supported in the pitch direction on a stationary base 210 and a second movable frame 230 that is movably supported in the yaw direction on a first movement frame 220.

The stationary base 210, when viewed in the vertical optical axis direction, is a rectangular member with its longer side aligned with substantially in the yaw direction and includes a movable frame support 211 and a motor mount 212 such that they are integrally connected in the yaw direction. A circular light projecting window 213 is formed in the center of the movable frame support 211. Guide shafts 214 and 215 extending in the pitch direction are supported on the upper surface of the movable frame support 211 on the opposite sides of the light projecting window 213 in the yaw direction.

The first movable frame 220 is a rectangular plate-like member with its slightly longer side aligned with the yaw direction such that it substantially covers the movable frame support 211 of the stationary base 210. The first movable frame 220 is provided with a light projecting window 221 at a position substantially corresponding to the light projecting window 213 of the stationary base 210. Two downwardly projecting supports 222 (in FIGS. 8 and 9, only one of them located on the front side is shown) are formed on the first movable frame 220, specifically, along the pitch direction on both edges of the right end of the first movable frame 220. Each support 222 has a support hole 222a formed therein. Regarding orientation with respect to the double-axis actuator 200, the right and left directions and up and down directions are the same as those in FIGS. 8 and 9, and the frontward and rearward directions correspond to the directions toward and away from the reader, respectively. A guide projection 223 is formed on the underside of the left edge of the first movable frame 220, and an engagement cutout 223a that is open on the left side is formed in the guide projection 223. Two support projections 224 are formed on the upper surface of the first movable frame 220, specifically, on left and right edges on the rear side of the upper surface. A guide shaft 225 is supported between the two support projections 224. Two support projections 226 are formed on the upper surface of the first movable frame 220, specifically, one at the right edge of the front side of the upper surface and the other at a position slightly to the left thereof. A guide shaft 227 is supported between the two support projections 226.

The two support holes 222a of the two supports 222 formed on the right edge of the first movable frame 220 receive the guide shaft 214 on the right side of the stationary base 210 such that the portions close to the ends of the guide shaft 214 are slidably inserted in the two support holes 222a. The engagement cutout 223a of the guide projections 223 at the left end of the first movable frame 220 slidably engages the guide shaft 215 on the left side of the stationary base 210. In this way, the first movable frame 220 is movably supported in the pitch direction on the upper surface of the stationary base 210.

A second movable frame 230 includes a lens support 231 and a magnet support 232 to the right thereof such that they are integrally connected. The lens support 231, when viewed as a plan view, is a rectangular member with its longer side aligned with the yaw direction and has a size slightly smaller than the first movable frame 220. The lens support 231 has a track-like lens support hole 233 with its longer side aligned with the yaw direction, in which the shake correction lens group Lc is supported. A long block-like support projection 234 with its longer side aligned with the yaw direction is formed on the rear edge of the second movable frame 230. The support projection 234 has a slide hole 234a formed therethrough in the yaw direction. A frontwardly projecting guide 235 is formed on the right end on the front side of the lens support 231, and an engagement cutout 235a that is open on the front side is formed in the guide 235. The magnet support 232 is located slightly above the lens support 231 and is connected with the lens support 231 by a stepped portion 236 therebetween.

The guide shaft 225 of the first movable frame 220 is slidably inserted in the slide holes 234a in the support projection 234 of the second movable frame 230. The engagement cutout 235a of the guide 235 of the second movable frame 230 slidably engages the guide shaft 227 of the first movable frame 220. In this way, the second movable frame 230 is movably supported in the yaw direction on first movable frame 220.

A linear motor 240 includes a stator coil 250 and a moving magnet 260.

The stator coil 250 has a voice coil 251 and a flat coil 252. The voice coil 251 is configured such that a coil wire is wound to form a tubular shape with its axial direction aligned with the pitch direction. The flat coil 252 has large and small coils 252a and 252b arranged side by side in the yaw direction, each coil being wound to form a track-like shape with the longer side aligned with the pitch direction. Electricity is fed into the two coils 251 and 252 through a flexible print board 253, which is supported by a backing plate 254. The voice coil 251 is supported on the underside of the flexible print board 253 and the flat coil 252 is supported on the top of the backing plate 254. A support mount 255 supports the backing plate 254 to form the stator coil 250. The stator coil 250 is placed on a motor placement portion 212 of the stationary base 210 by fixing the support mount 255 of the stator coil 250 on the upper surface of the motor placement portion 212 of the stationary base 210.

The moving magnet 260 includes a back yoke 261 and two magnets 262 and 263. The back yoke 261 is formed of two planar rectangular yoke pieces 261a and 261b with their longer sides aligned with the pitch direction such that the upper and lower yoke pieces 261a and 261b are placed parallel, facing each other, and integrally connected by a connecting piece 261c at their rear left ends. The magnet 262 is fixed on the underside of the upper yoke piece 261a and the magnet 263 is fixed on the upper side of the lower yoke piece 261b, thereby forming the moving magnet 260. The upper side of the upper yoke piece 261a is supported on the underside of the magnet support 232 of the second movable frame 230 and the left side of the connecting piece 261c is supported on the right side of the stepped portion 236 of the second movable frame 230, thereby supporting the moving coil 260 on the second movable frame 230. The lower yoke piece 261b and the magnet 263 are inserted in the voice coil 251 of the stator coil 250 such that the lower yoke piece 261b and the magnet 263 are movable in the pitch and yaw directions, and the upper magnet 262 is placed over the flat coil 252, facing each other, with a small gap therebetween.

When the voice coil 251 of the double-axis actuator 200 is energized, a moving force in the pitch direction acts on the moving magnet 260. The moving force is transferred to the first movable frame 220 via the second movable frame 230 and the first movable frame 220 is moved in the pitch direction along the guide shafts 214 and 215 of the stationary base 210. Consequently, the second movable frame 230 supported on the first movable frame 220 moves in the pitch direction and hence the shake correction lens Lc supported in the second movable frame 230 moves in the pitch direction. When the flat coil 252 is energized, a moving force in the yaw direction acts on the moving magnet 260. The moving force is transferred to the second movable frame 230, which is then moved in the yaw direction along the guide shafts 225 and 227 of first movable frame 220. Consequently, the shake correction lens Lc supported in the second movable frame 230 moves in the yaw direction.

As described above, by selecting the direction and the amount of the current applied to the voice coil 251 and/or the flat coil 252 as appropriate in the double-axis actuator 200, the shake correction lens Lc can be moved in all directions perpendicular to the vertical optical axis Xg by a desired amount. In the double-axis actuator 200, since the movable portion including the shake correction lens Lc is supported in the gravitational direction on the stationary base 210, coils 251 and 252 may not be required to be energized except when the shake correction lens Lc may be required to move. Even when the attitude of the imaging apparatus and hence the imaging lens device inclines to a certain extent, the shake correction lens Lc can be held in a desired position with a small current. In particular, since the moving magnet 260 has the magnets 262 and 263, unless the coils 251 and 252 are energized, the moving magnet 260 is positioned at a neutral position where the resultant attractive force of the magnets 262 and 263 is in a stable state. By setting the neutral position to a position where the center of the shake correction lens Lc coincides with the vertical optical axis, the coil 250 may require very little current flowing therein when the handshake correction function is not activated.

In the double-axis actuator 200, since the double-axis drive unit for the pitch and yaw directions, that is, the linear motor 240 is placed all together on one end in the yaw direction, the size in the yaw direction becomes larger, while the size in the pitch direction (the depth direction of the imaging apparatus) can be minimized to the extent that may be required for supporting the shake correction lens Lc movable in the two directions. This means that the presence of the double-axis actuator 200 does not prevent a slim imaging lens device and imaging apparatus.

Of course, it is not intended that the drive means of the shake correction lens (group) in the invention is limited to the double-axis actuator 200 described above.

Specific shapes and structures as well as numerical values of the portions shown in the above embodiments and numerical examples are by way of example only to embody the invention and should not be construed as limiting the technical range of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging lens device comprising:
a light path folding optical system having a reflector that folds the optical axis incident perpendicular to the gravitational direction toward the gravitational direction;
an imaging element that converts an image formed by the light path folding optical system into an electrical signal; and
drive means that moves a shake correction lens group including at least one lens in the direction perpendicular to a vertical optical axis, the vertical optical axis being folded toward the gravitational direction by the reflector,
wherein the shake correction lens group is moved in the direction perpendicular to the vertical optical axis to move the image in the direction perpendicular to the vertical optical axis.

2. The imaging lens device according to claim 1,
wherein the drive means mechanically bears the weight of the shake correction lens group in the gravitational direction.

3. The imaging lens device according to claim 1,
wherein the shake correction lens group is fixed in the vertical optical axis direction.

4. The imaging lens device according to claim 1,
wherein the shake correction lens group is all or part of a lens group located closest to the imaging element and satisfies the condition equation (1) $|(1-\beta a) \times \beta b| < 1.8$, where $\beta a$ is the magnification of the shake correction lens group and $\beta b$ is the magnification of the lens group located next to the shake correction lens group and closer to the image plane.

5. The imaging lens device according to claim 1,
wherein the light path folding optical system includes a plurality of lens groups and works as a zoom lens system in which its magnification changes when the respective distances between the lens groups change; and
the reflector is placed in a stationary lens group during zooming.

6. The imaging lens device according to claim 1,
wherein the light path folding optical system includes, in order of increasing distance from an object, a first lens group that has positive power and is stationary during zooming, a second lens group having negative power, a third lens group having positive power, a fourth lens group having positive power, and a fifth lens group having negative power;
zooming is performed by moving at least the second and fourth lens groups;
the first lens group includes, in order of increasing distance from an object, a first single lens having negative power, a reflector that folds the optical axis incident perpendicular to the gravitational direction by 90 degrees toward the gravitational direction, and at least one second lens having positive power; and
a positive lens group in the fifth lens group is the shake correction lens group.

7. The imaging lens device according to claim 1,
wherein the mechanism of the drive means may not require any holding electrical power for holding the shake correction lens group aligned with the vertical optical axis.

8. An imaging lens device comprising:
a light path folding optical system having a reflector that folds the optical axis incident perpendicular to the gravitational direction toward the gravitational direction;
an imaging element that converts an image formed by the light path folding optical system into an electrical signal; and
drive means that moves the imaging element in the direction perpendicular to a vertical optical axis, the vertical optical axis being folded toward the gravitational direction by the reflector.

9. The imaging lens device according to claim 8,
wherein the drive means mechanically bears the weight of the imaging element in the gravitational direction.

10. The imaging lens device according to claim 8,
wherein the light path folding optical system includes a plurality of lens groups and works as a zoom lens system in which its magnification changes when the respective distances between the lens groups change; and
the reflector is placed in a stationary lens group during zooming.

11. The imaging lens device according to claim 8,
wherein the mechanism of the drive means may not require any holding electrical power for holding the shake correction lens group aligned with the vertical optical axis.

12. An imaging apparatus comprising:
an imaging lens device having a light path folding optical system and an imaging element that converts an image formed by the light path folding optical system into an electrical signal;
hand-shake detection means that detects shake of the imaging lens device; and
hand-shake correction control means that corrects displacement of the imaging position of the object image based on the shake of the imaging lens device detected by the hand-shake detection means,
the imaging lens device including a reflector that folds the optical axis incident perpendicular to the gravitational direction toward the gravitational direction, and drive means that moves a shake correction lens group including at least one lens in the direction perpendicular to a vertical optical axis, the vertical optical axis being folded toward the gravitational direction by the reflector,
wherein the imaging lens device is configured such that the shake correction lens group is moved in the direction perpendicular to the vertical optical axis to move the image in the direction perpendicular to the vertical optical axis; and
the hand-shake correction control means instructs the drive means to move the shake correction lens group by an amount and in a direction based on the shake of the imaging lens device detected by the hand-shake detection means.

13. An imaging apparatus comprising:
an imaging lens device having a light path folding optical system and an imaging element that converts an image formed by the light path folding optical system into an electrical signal;
hand-shake detection means that detects shake of the imaging lens device; and
hand-shake correction control means that corrects displacement of the imaging position of the object image based on the shake of the imaging lens device detected by the hand-shake detection means, the imaging lens device including a reflector that folds the optical axis incident perpendicular to the gravitational direction toward the gravitational direction, and drive means for moving the imaging element in the direction perpendicular to a vertical optical axis, the vertical optical axis being folded toward the gravitational direction by the reflector, wherein the hand-shake correction control means instructs the drive means to move the imaging element by an amount and in a direction based on the shake of the imaging lens device detected by the hand-shake detection means.

* * * * *